June 28, 1960

L. H. MORIN 2,942,407

PLASTIC TRAVELER WITH WEAR RESISTANT ROLLER

Filed May 23, 1958

INVENTOR
LOUIS H. MORIN
BY
ATTORNEY

# United States Patent Office 2,942,407
Patented June 28, 1960

2,942,407

PLASTIC TRAVELER WITH WEAR RESISTANT ROLLER

Louis H. Morin, Bronx, N.Y., assignor to Coats & Clark Inc., New York, N.Y., a corporation of Delaware Filed May 23, 1958, Ser. No. 737,255

16 Claims. (Cl. 57—125)

This invention relates to travelers preferably molded from plastic material, wherein a roller of harder and wear surface material is positioned in that part of the hook end of the traveler for engagement with the thread or strand in the use of the traveler.

More particularly, the invention deals with a structure of the character described, wherein the traveler includes an axis portion, upon which the roller is free to rotate, the axis portion in one instance serving to unite two traveler parts; whereas, in the other instance, the axis is formed by means integrally joining the traveler parts.

The novel features of the invention will be best understood from the following description, when taken together with the accompanying drawing, in which the separate parts are designated by suitable reference characters in each of the views and, in which.

Figure 1:
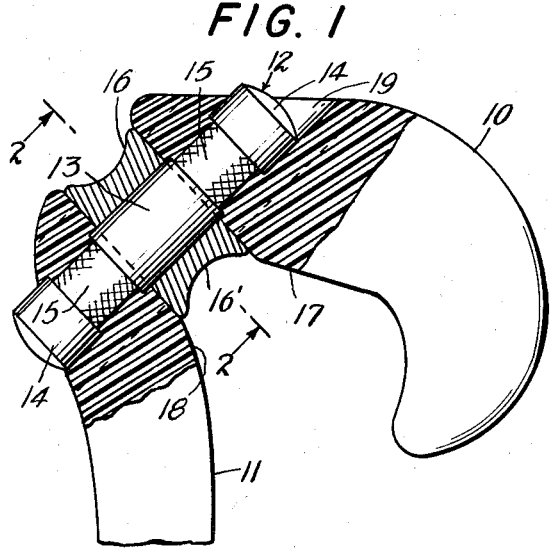
Fig. 1 is a side and sectional view through one end portion of a traveler made according to my invention, with part of the construction being shown in elevation.
Figure 2:
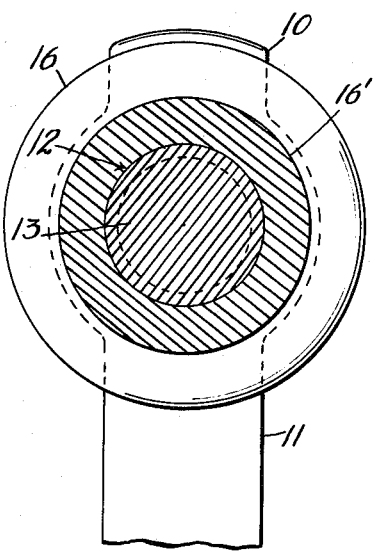
Fig. 2 is an enlarged section on the line 2—2 of Fig. 1.

In Figs. 1 and 2 of the drawing, I have shown one large hook end portion of a traveler, in which the hook end portion is formed by a curved hook part 10 and a shank part 11, joined by a stud 12, upon which the parts 10 and 11 are molded. The stud 12 has a central cylindrical axis portion 13, between which, and the rounded ends 14, the stud includes reduced knurled or otherwise roughened portions 15.

It will, thus, be seen that, in molding the parts 10 and 11 on the portions 15, these portions will serve to definitely retain the stud or axis against rotation. It will also appear that the ends of 13 extend into both parts 10 and 11, so as to definitely key the parts 10 and 11 against movement axially of the stud 12.

In molding the traveler, it will appear that a grooved roller 16 will be positioned on the axis portion 13 and the roller with the stud 12 arranged in the dies, preparatory to molding the parts 10 and 11 thereon. Upon completing these molding operations, the roller 16 will be disposed between adjacent surfaces of the parts 10 and 11 and free to rotate on the axis portion 13. The plane of the roller may be defined as a plane through the roller perpendicular to axis portion 13.

Considering Fig. 2 of the drawing, it will appear that the parts 10 and 11, extending beyond the stud 12, are materially reduced in thickness, thus leaving the roller 16 fully exposed at the sides of the traveler. It will appear that the inner surface 17 of the part 10 and the corresponding surface 18 of the part 11 converge into the curvature 16' of the roller 16, so as to provide a free guide for the thread or strand into the roller in the use of the traveler.

In the molding operation, the stud 12 is supported in the dies as a core and one of the pins supporting the stud will form, beyond the end of the stud, a recess 19, as in the part 10; whereas, the other end of the stud is fully exposed beyond the part 11. The purpose of this construction is to minimize the overall length of the stud, it being understood that both ends of the stud, or the parts 14 and 15, must be of equal length and spacing with respect to the part 13, so that the positioning of the stud in the die with respect to ends of the stud is immaterial.

Figure 3:
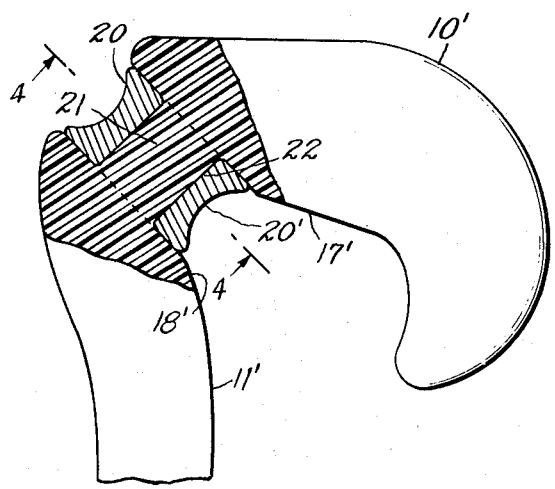
Fig. 3 is a view similar to Fig. 1 showing a modification.
Figure 4:
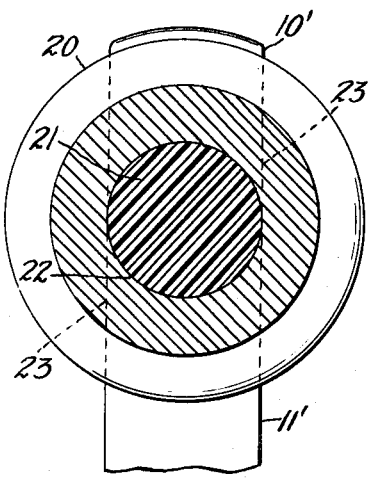
Fig. 4 is an enlarged section on the line 4—4 of Fig. 3.

The stud 12 will preferably be formed of metal; whereas the roller 16, as well as the roller 20 shown in Figs. 3 and 4 of the drawing, will preferably be composed of metal, ceramics, synthetic sapphire or similar materials to provide the desired wear properties for travelers of the character described.

Considering Fig. 3 of the drawing, it will appear that the traveler portions 10', 11' are generally similar to the parts 10 and 11, but differing from these parts in including a bearing stud portion 21 which integrally joins the two parts so that, in suitably supporting the roller 20 in the dies used for molding the traveler, the plastic material molding the parts 10', 11' will integrally join said parts in the bearing or stud portion 21 which is positioned within the bore 22 of the roller 20. When the plastic material sets, the shrinkage of 21 in the bore 22 will be sufficient to provide free rotation of the roller 20.

It will also appear, from a consideration of Fig. 4 of the drawing, that the parts 10', 11' have alined side walls, as at 23 and these are preferably spaced a distance equal to the diameter of the bearing or stud part 21.

Again, considering Fig. 3, it will appear that the inner surfaces 17' and 18' of the parts 10', 11' also converge into the curvature 20' of the roller 20.

It will be apparent that the stud 12, including the portion 21, integrally joining the parts 10', 11' form an axis, upon which the rollers 16 and 20 are rotatable, the concavely grooved annular outer surfaces of the rollers forming, of said rollers, spool-like members and, by reason of the rotation of these members, the same will form a substantially anti-frictional engagement of the thread with these wear resistant members.

Having fully described my invention, what I claim as new and desire to secure by Letters Patent is:

1. A molded plastic traveler having a hook part and shank part, means joining said parts, said means forming an axis between the parts at the thread engaging portion of the traveler, and a roller of wear resistant material mounted on said axis and forming the means for engaging the thread in the use of the traveler.

2. A traveler as defined in claim 1, wherein the first named means comprises a plastic part integrally joining the hook and shank parts.

3. A traveler as defined in claim 1, wherein said roller includes a curved concave annular outer surface.

4. A traveler as defined in claim 3, wherein surfaces of the hook and shank parts register with the curved surface of said roller.

5. A traveler as defined in claim 1, wherein the first named means comprises a stud.

6. A traveler as defined in claim 5, wherein the central portion of the stud forms said axis, and the central portion extends into the hook and shank parts to space said parts, providing free rotation of the roller on said axis.

7. A traveler as defined in claim 6, wherein end portions of the stud include means for keying the first named parts against rotation on the stud.

8. A traveler as defined in claim 6, wherein end portions of the stud are exposed through said first named parts.

9. A traveler as defined in claim 5, wherein end portions of the stud include means retaining the hook and shank parts against movement axially of the stud.

10. A traveler as defined in claim 1, wherein the width of the hook and shank parts is less than the diameter of said roller.

11. A traveler as defined in claim 5, wherein said stud is composed of metal, and end portions of the stud, beyond the axis portion, include means, keying the hook and shank parts against axial and rotary movement on the stud.

12. A plastic traveler having a hook part and a shank part, means joining said parts, said means forming a cylindrical axis bridging and spacing adjacent surfaces of the parts, and anti-frictional means having wear resistant properties rotatably mounted on said axis and providing the means engaging the thread in the use of the traveler.

13. A traveler as defined in claim 12, wherein said first named means comprises a stud, the stud having reduced portions embedded in said parts, and said reduced portions being roughened for keying the parts and stud against relative rotary movement.

14. A traveler as defined in claim 13, wherein ends of the stud are exposed through each of said parts.

15. A traveler as defined in claim 1, wherein the axis lies substantially in the plane of the hook and shank portions.

16. The traveler of claim 1 in which the plane of the roller lies between the paths of thread entering and leaving the traveler during use.

References Cited in the file of this patent

UNITED STATES PATENTS 1,834,874     Schaaff _____ Dec. 1, 1931

FOREIGN PATENTS 296,224     Great Britain _____ Aug. 30, 1928